United States Patent
Kalra et al.

(10) Patent No.: US 8,649,424 B2
(45) Date of Patent: Feb. 11, 2014

(54) VIDEO TRANSCODING USING A PROXY DEVICE

(75) Inventors: Sanjay Kalra, San Jose, CA (US); Raghavendra Mallya, San Ramon, CA (US); Anand S. Athreya, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 629 days.

(21) Appl. No.: 12/707,436

(22) Filed: Feb. 17, 2010

(65) Prior Publication Data

US 2011/0200094 A1  Aug. 18, 2011

(51) Int. Cl.
*H04N 7/173* (2011.01)
*H04H 20/28* (2008.01)

(52) U.S. Cl.
USPC .............................. 375/240; 370/468; 725/98

(58) Field of Classification Search
None
See application file for complete search history.

(56) References Cited

U.S. PATENT DOCUMENTS

| | | | | |
|---|---|---|---|---|
| 6,798,786 B1 * | 9/2004 | Lo et al. | | 370/468 |
| 6,985,559 B2 * | 1/2006 | Hardy | | 379/1.02 |
| 7,085,230 B2 * | 8/2006 | Hardy | | 370/232 |
| 7,254,120 B2 * | 8/2007 | LeBlanc | | 370/335 |
| 7,512,118 B1 * | 3/2009 | Stephens | | 370/352 |
| 2008/0201748 A1 * | 8/2008 | Hasek et al. | | 725/98 |
| 2008/0205389 A1 * | 8/2008 | Fang et al. | | 370/389 |
| 2010/0014528 A1 * | 1/2010 | Amir et al. | | 370/400 |
| 2010/0017529 A1 * | 1/2010 | Takacs et al. | | 709/231 |

FOREIGN PATENT DOCUMENTS

EP  1 079 573 A2  2/2001

OTHER PUBLICATIONS

Extended European Search Report, Jun. 29, 2011, 7 pages.

* cited by examiner

*Primary Examiner* — Jay Patel
*Assistant Examiner* — Reza Aghevli
(74) *Attorney, Agent, or Firm* — Harrity & Harrity, LLP

(57) ABSTRACT

A network device may act as a proxy for a client requesting video from a server and may control the quality of the video requested from the server. The network device may detect a negotiation for a video stream, the negotiation including at least a first message from the client indicating a requested video quality by the client; and determine a maximum allowed video quality for the client. The network device may additionally determine whether the requested video quality by the client is greater than the maximum allowed video quality and modifying, when the requested video quality by the client is greater than the maximum allowed video quality, a first message to change the requested video quality to be equal to the maximum allowed video quality.

20 Claims, 7 Drawing Sheets

VIDEO TRANSCODING USING A PROXY DEVICE

BACKGROUND

Communication networks typically include devices, such as firewalls, routers, switches or gateways, which transfer or switch data, such as packets, from one or more sources to one or more destinations. A firewall or gateway device, for example, may permit, deny, encrypt, decrypt, or proxy traffic between different security domains based upon a set of rules and other criteria.

Entities, such as corporations, may use firewall/gateway devices to limit access to resources. For example, a firewall may be used to block access to certain external websites by employees. A firewall or gateway device may also be used to limit the use of a particular resource. For example, video sessions using certain video codecs (video coder-decoder protocols) may be blocked.

SUMMARY

One implementation is directed to method, implemented by a network device, including monitoring communications between a group of client devices and an external network; detecting, by the network device and based on the monitoring, a negotiation for a video stream occurring between a first client device of the group of client devices and a server device in the external network, the negotiation including at least a first message from the first client device indicating a requested video quality by the first client device; determining a maximum allowed video quality for the first client device; determining whether the requested video quality by the first client device is greater than the maximum allowed video quality; modifying, when the requested video quality by the first client device is greater than the maximum allowed video quality, the first message to change the requested video quality to be equal to the maximum allowed video quality; and transmitting the modified first message to the server device in place of the first message from the client device.

In another implementation, a network device may include input/output ports to connect client devices within a local area network to server devices in an external network and a proxy component. The proxy component may monitor communications between the client devices and the server devices; receive information relating to a maximum allowed video quality corresponding to users of the client devices; intercept messages from the client devices relating to codec negotiations for video streams requested by the client devices; modify a first one of the intercepted messages when a video quality requested in the first intercepted message is above the maximum allowed video quality of the user corresponding to the first intercepted message; and transmit the modified first intercepted message in place of the first message.

In yet another implementation, a device may include a processor; and a memory to store instructions for execution by the processor. The instructions may include instructions to monitor communications between a group of client devices and an external network; detect a negotiation for a video stream occurring between a client device of the group of client devices and a server device in the external network, the negotiation including at least a first message from the client device indicating a requested video quality by the first client device; determine a maximum allowed video quality for the client device; determine whether the requested video quality by the client device is greater than the maximum allowed video quality; modify, when the requested video quality by the first client device is greater than the maximum allowed video quality, the first message to change the requested video quality to be equal to the maximum allowed video quality; and transmit the modified first message to the server device in place of the first message from the client device.

BRIEF DESCRIPTION OF THE DRAWINGS

The accompanying drawings, which are incorporated in and constitute a part of this specification, illustrate one or more embodiments described here and, together with the description, explain these embodiments. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, a network device, such as a gateway, firewall, or router may automatically down-negotiate the quality of video sessions on behalf of client to a preset maximum video quality. More specifically, the network device may intercept codec negotiations between the user (client) and the video server by monitoring protocol messages used to negotiate the codec information. The networking device may act as a proxy on behalf of the client and change the codec requested from the video server based on a policy.

Exemplary System Overview

Figure 1:
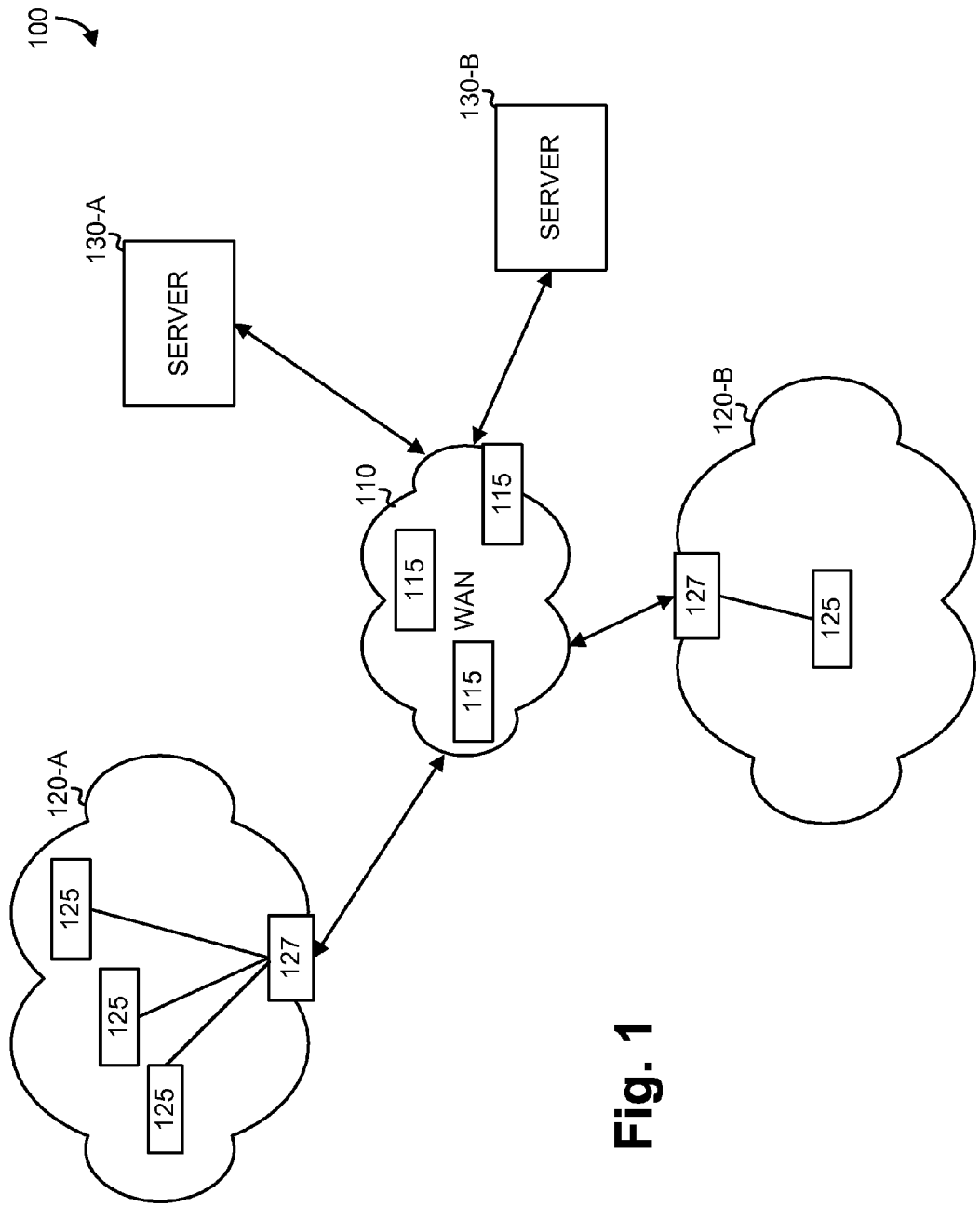
FIG. 1 is a diagram of an exemplary system in which concepts described herein may be implemented.

FIG. 1 is a diagram of an exemplary system 100 in which concepts described herein may be implemented. System 100 may include a wide area network (WAN) 110 connected to one or more private networks 120-A and 120-B (collectively referred to as private networks 120) and one or more servers 130-A and 130-B (collectively referred to as servers 130). Private networks 120 may each, for example, include corporate or individual local area networks (LANs).

WAN 110 may generally include one or more types of networks. For instance, WAN 110 may include a cellular network, a satellite network, the Internet, or a combination of these (or other) networks that are used to transport data. Although shown as a single element in FIG. 1, WAN 110 may include a number of separate networks that function to provide services, such as video content, to private networks 120. Alternatively, the services may be provided to private networks 120 from another private network 120. WAN 110 may be implemented using a number of network devices 115.

Network devices 115 may include, for example, routers, switches, gateways, and/or other devices that are used to implement WAN 110.

Private networks 120 may each include a number of computing devices, such as, for example, client computing devices 125 ("clients") and network devices 127. Clients 125 may include computing devices of end-users, such as desktop computers, laptops, or hand-held computing devices such as smart phones, notebooks, tablet computers, etc. Network devices 127, similar to network devices 115, may include network devices used to implement private networks 120, such as firewalls, gateways, network acceleration devices, switches, routers, combinations of these devices, or other devices relating to network implementation, control, and/or security.

Network devices 115 and 127 may each implement a network operating system that controls the resources of the network device and provides an interface to the network device through which users can modify the configuration of the network device.

Servers 130-A and 130-B may each include, for example, a computing device or group of computing devices designed to provide services to clients 125. Servers 130-A and 130-B may particularly include servers that provide video to clients 125.

In the exemplary system shown in FIG. 1, two private networks 120-A and 120-B and two servers 130-A and 130-B are shown. In other implementations, system 100 may include additional, fewer, different, or differently arranged networks and/or devices. Additionally, in some implementations, tasks described as being performed by one device in FIG. 1 may be performed by a different one or more devices in FIG. 1.

Exemplary Device Architectures

Figure 2:
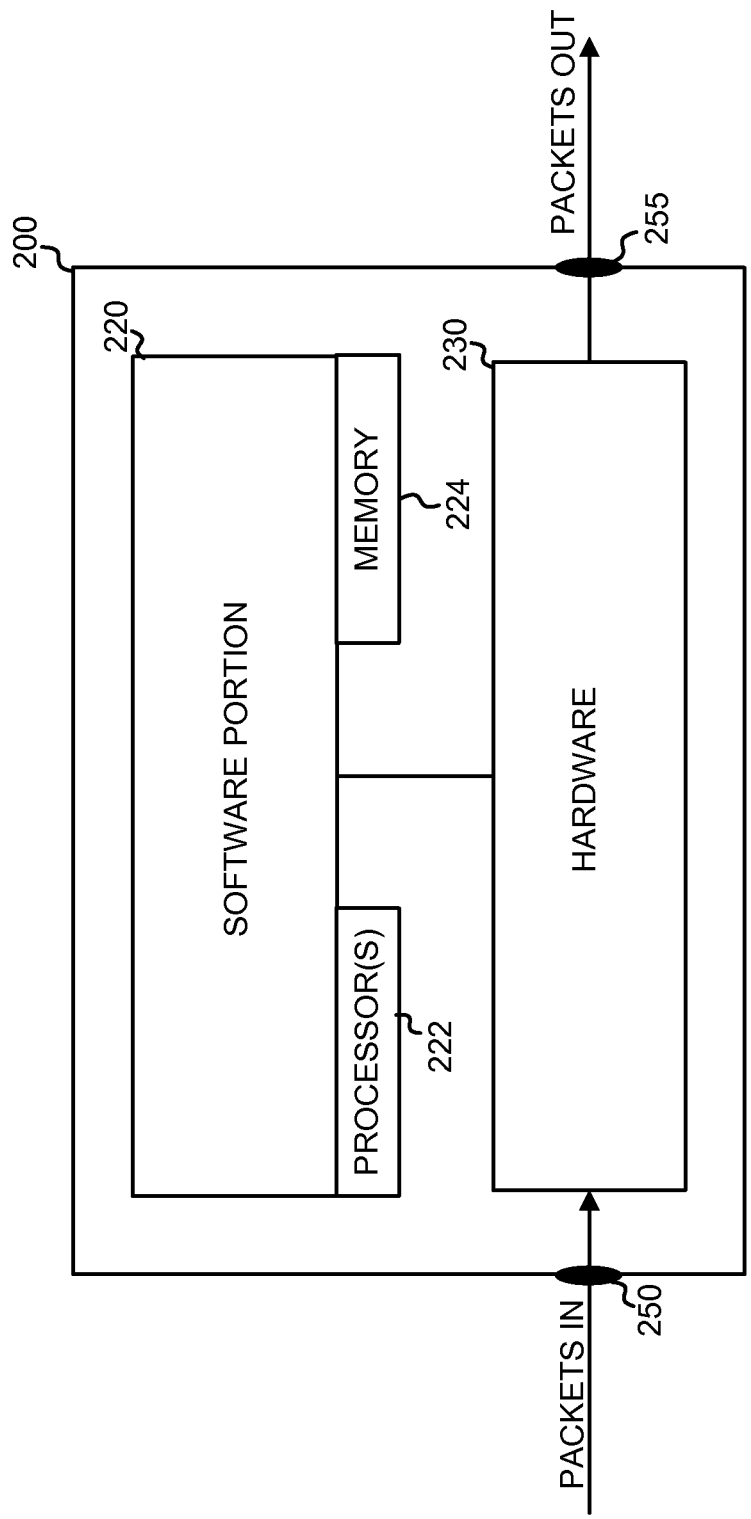
FIG. 2 is a block diagram of an exemplary network device which may correspond to one of network devices shown in FIG. 1.

FIG. 2 is a block diagram of an exemplary network device 200, which may correspond to one of network devices 115 or 127. In order to increase throughput, network device 200 may use dedicated hardware to assist in processing incoming units of data, such as packets. In some alternative implementations, units of data (data units) other than packets may be used. As shown in FIG. 2, network device 200 may generally include a software portion 220 and a hardware portion 230.

Software portion 220 may include software designed to control network device 200. In general, software portion 220 may implement the functions of the network device that are not time critical. The functions described as being performed by software portion 220, may be implemented through, for example, one or more general purpose processors 222 and one or more computer memories 224. Processors 222 may include processors, microprocessors, or other types of processing logic that may interpret and execute instructions. Computer memories 224 (also referred to as computer-readable media herein) may include random access memories (RAMs), read-only memories (ROMs), and/or other types of dynamic or static storage devices that may store information and instructions for execution by one or more processors 222.

Hardware portion 230 may include circuitry for efficiently processing packets received by network device 200. Hardware portion 230 may include, for example, logic, such as an application specific integrated circuit (ASIC), a field programmable gate array (FPGA), and/or a content-addressable memory (CAM). When network device 200 is a router, hardware portion 230 may, for example, receive incoming packets, extract header information for the packets, and process the packets based on the extracted header information. When network device is a firewall or gateway, hardware portion 230 may, for example, receive incoming packets, extract header information from the packets, and match portions of the header information to a lookup table, such as one stored in a ternary content addressable memory, to determine whether the packet should be dropped.

Network device 200 may additionally include one or more input ports 250 for receiving incoming packets and one or more output ports 255 for transmitting outgoing packets. In some implementations, a port may act as both or one of an input port 250 or an output port 255. Ports 250/255 may also be used to receive remote user connections for configuring the operation of network device 200.

Although network device 200 is shown as including a software portion 220 and a hardware portion 230, network device 200 may, in some implementations, be implemented entirely through hardware. Additionally, network device 200 may include additional, fewer, different, or differently arranged components than those illustrated.

Figure 3:
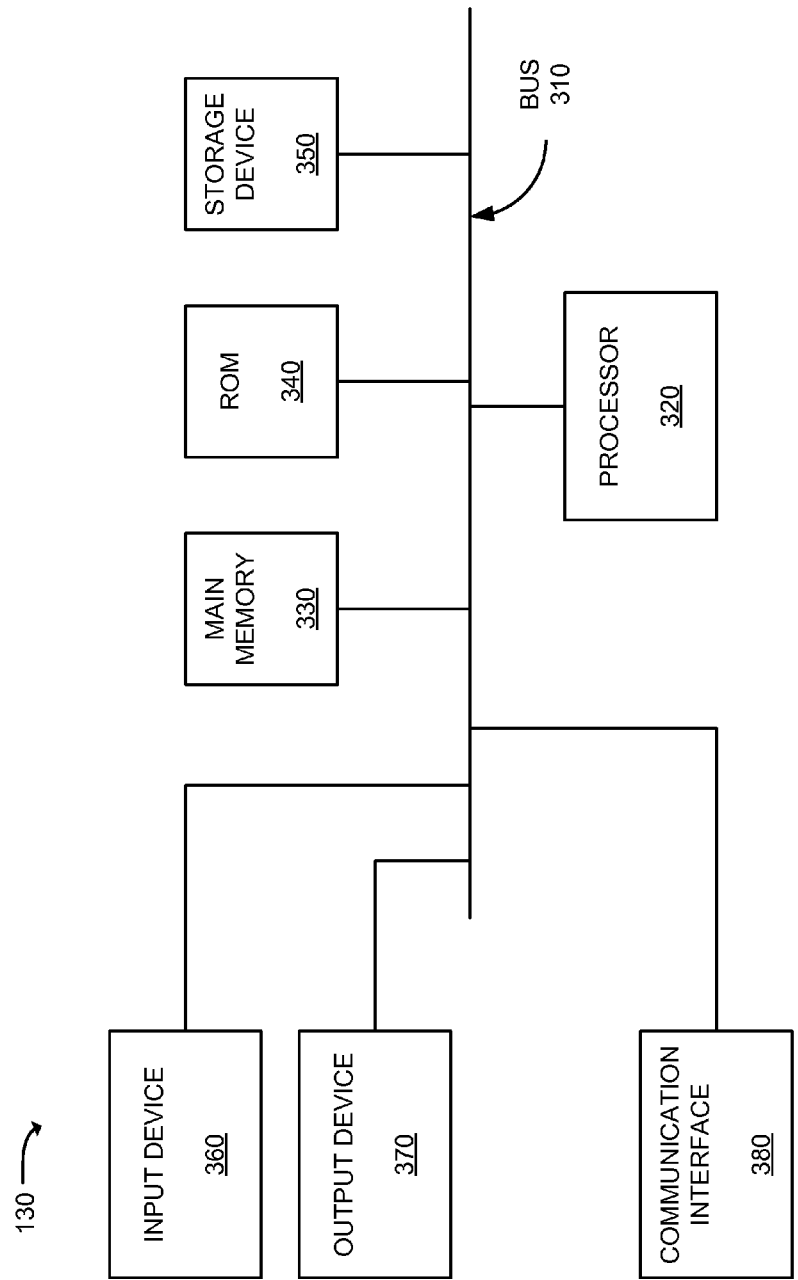
FIG. 3 is a diagram of exemplary components of a server shown in FIG. 1.

FIG. 3 is a diagram of exemplary components of one of servers 130. As shown in FIG. 3, server 130 may include a bus 310, a processor 320, a main memory 330, a read only memory (ROM) 340, a storage device 350, an input device 360, an output device 370, and a communication interface 380. In another implementation, a server 130 may include additional, fewer, different, or differently arranged components than are illustrated in FIG. 3.

Bus 310 may include a path that permits communication among the components of the server 130. Processor 320 may include a processor, a microprocessor, or processing logic (e.g., an application specific integrated circuit (ASIC) or a field programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive, or a removable form of memory, such as a flash memory.

Input device 360 may include a mechanism that permits an operator to input information to the server 130, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables server 130 entity to communicate with other devices and/or systems. For example, communication interface 380 may include mechanisms for communicating with another device or system via a network, such as network 110. In some implementations, server 130 may be a "headless" server, in which case, input devices 360 and output devices 370 for directly interacting with a user may not be included.

Servers 130, as described below, may include servers that provide video to clients 125. As one example of a typical video session, a client may request a video resource from a server 130. The client and server may then negotiate, using a protocol such as SIP (session initiation protocol) or H.323, the codec to use in delivering the video. The negotiation of the codec to use may include, for example, negotiating the type of compression used in delivering the video, the resolution of video (e.g., standard definition or high definition), or other factors relating to how the video is to be delivered to the client. In a typical video negotiation, the client and server will agree on a codec that supports the highest quality video supported by both the client and server.

Transcoding Video Negotiations by Network Device

Figure 4:
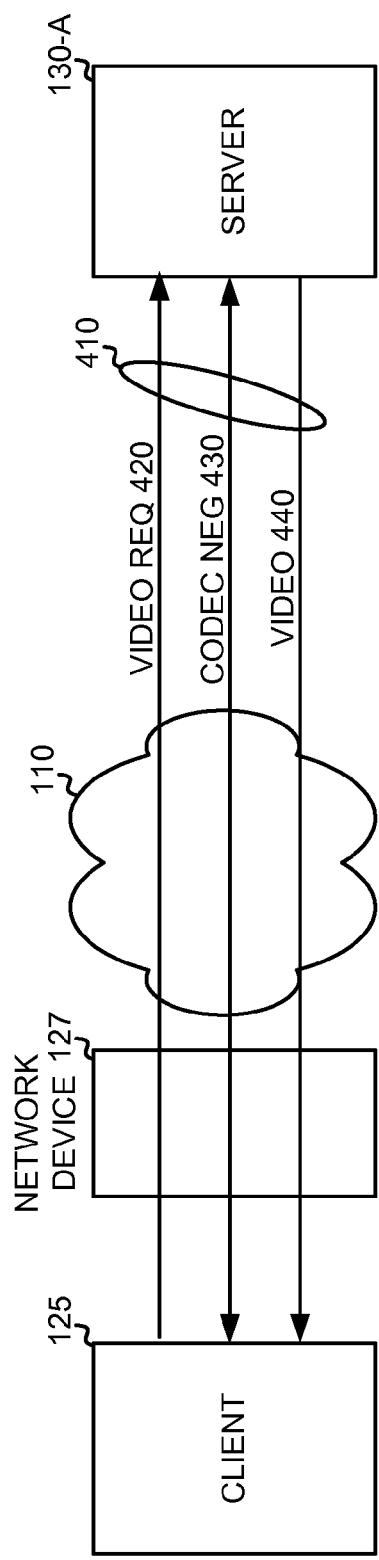
FIG. 4 is a diagram illustrating a portion of a system that may perform transcoding of video negotiations.

FIG. 4 is a diagram illustrating a portion of system 100, including a gateway, firewall, or routing network device 127, that may perform transcoding of video negotiations in order to control video quality delivered to clients 125. Transcoding, as used herein, refers to the conversion or changing of one encoding standard to another. Video transcoding may generally be performed by network device 127 to control the bandwidth of video signals requested by clients 125.

As shown, client 125 may communicate with a server, server 130-A. Client 125 may particularly communicate with server 130-A to receive video, such as streaming video, from server 130-A. The communications with server 130-A may be performed through network device 127 and over WAN 110. Network device 127 may operate as a firewall or gateway that controls the access of client 125 to WAN 110.

Exemplary communications 410 in a video session between client 125 and server 130-A are illustrated in FIG. 4. Client 125 may request a resource from server 130-A, such as a resource corresponding to video (VIDEO REQ 420). The particular codec to use in sending the resource to client 125 may be negotiated (CODEC NEG 430). The negotiation of the codec may include negotiating the type of compression used for the video, the resolution of video (e.g., standard definition or high definition), or other factors relating to how the video is to be delivered to client 125. Using the negotiated codec, server 130-A may transmit the requested video to client 125 (VIDEO 440).

Figure 5:
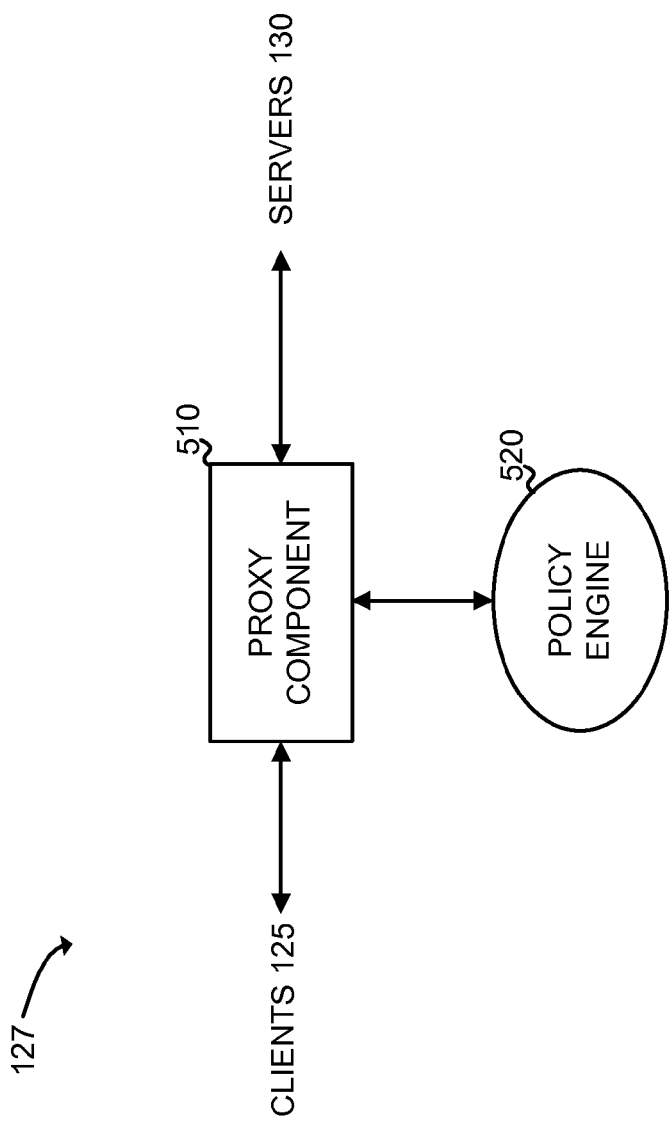
FIG. 5 is a diagram illustrating exemplary functional components of a network device.

FIG. 5 is a diagram illustrating exemplary functional components of one of network devices 127. Network device 127 may include proxy component 510 and policy engine 520. Proxy component 510 and policy engine 520 may be physically implemented in, for example, software portion 220, hardware portion 230, or a combination of software portion 220 and hardware portion 230 of network device 200.

Proxy component 510 may operate to monitor communications between clients 125 and servers 130, and when necessary act as a proxy for a client 125 in communicating with a server 130. In general, a proxy may be a device that acts as an intermediary for requests from clients seeking resources from servers 130. Proxy component 510 may evaluate the request from clients 125 and may request the service on behalf of the client. Consistent with concepts described herein, proxy component 510 may alter the request from a client to modify the codec requested by the client.

Whether to modify the codec requested by a client 127, and the codec to use as the modified version of the codec, may be determined by proxy component based on policy engine 520. Policy engine 520 may include a database, file, or other structure used to store policy information for users of clients 127. Policy engine 520 may generally include a model defining access privileges and preferences for the users of clients 127, which may be set, for example, by a network administrator. Policy engine 520 may be located locally on network device 127 or may be located remotely on another network device, such as another network device in the same or different private network 120. Policy engine 520 may particularly include a desired maximum video codec or quality that can be requested by a particular user of a client 125.

In some implementations, the policies stored by policy engine 520 may be dynamic and may change, based on, for example, the time of day or the current load on private network 120. For example, policy engine 520 may include policies that limit the video quality that can be delivered to certain users during business hours, but do not limit the quality outside of business hours. As another example, whether to limit video quality may be based on a current network traffic load from private network 120 to WAN 110 (e.g., video quality for certain users may be limited if the traffic to WAN 110 is high but otherwise not limited).

Although FIG. 5 shows exemplary functional components of a network device 127, in other embodiments, network device 127 may contain fewer, different, differently arranged, or additional functional components than depicted in FIG. 5.

Figure 6:
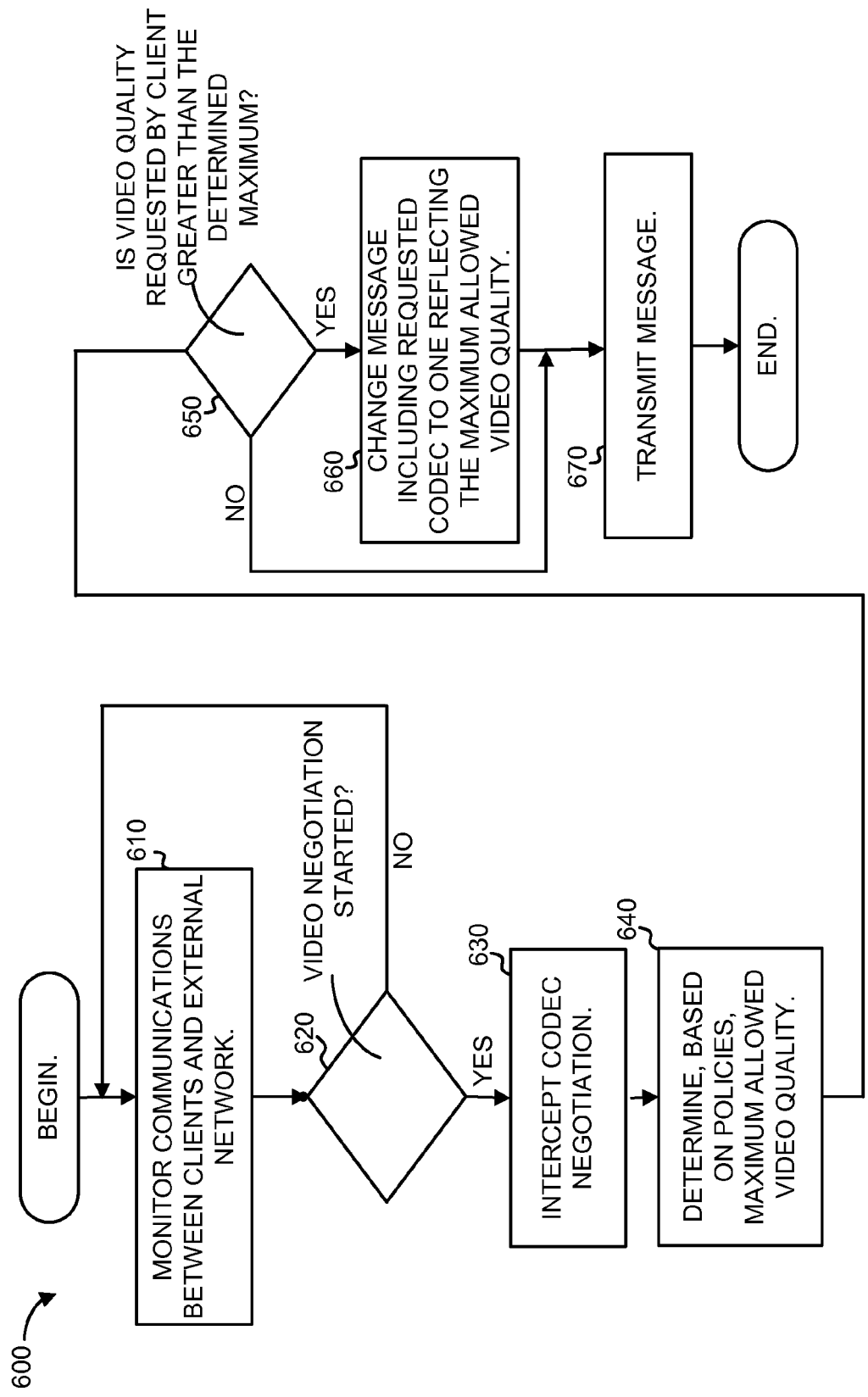
FIG. 6 is a flow chart illustrating an exemplary process that may be performed by a network device.

FIG. 6 is a flow chart illustrating an exemplary process 600 that may be performed by a network device 127. Process 600 may be performed by software portion 220, hardware portion 230, or both software portion 220 and hardware portion 230 of network device 127.

Process 600 may include monitoring communications between clients 125 and an external network (block 610). Network device 127 may implement process 600 as part of the functionality of a firewall, gateway, or other network device used to manage communications between a private network 120 and an external network, such as WAN 110. Network device 127 may, for example, detect when a new communication session is initiated by a client 125 by, for example, monitoring SIP, H.323, or other protocols, that may be used to begin a video session. Network device 127 may particularly monitor the SIP or H.323 communications to detect when a new codec negotiation is begun with a video server. Monitoring the SIP or H.323 communications may particularly include, for example, scanning SIP or H.323 messages transmitted between clients 125 and servers 130.

When a codec video negotiation is started, (block 620—YES), process 600 may additionally include intercepting the codec negotiation (block 630). For example, process 600 may include intercepting SIP or H.323 messages that are part of the codec negotiation. At this point, proxy component 510 may act as a proxy for client 125 when communicating with server 130.

Process 600 may additionally include determining the maximum allowed video quality for the client (block 640). The determination of the maximum allowed video quality may be made based on a lookup using policy engine 520. The maximum allowed quality may be specified in a number of different ways, such as based on a specification of the level of compression of the video stream, the resolution of the video stream, or a maximum average bandwidth. Then lookup using policy engine 520 may include a query based on the client or user associated with the client, which may be identified from the intercepted codec negotiation.

Process 600 may additionally include determining whether the video quality requested by client 125 is greater than the maximum allowed video quality (block 650). In some instances, the video quality requested by client 125 may be at or below the maximum allowed video quality (as determined in block 640). In this case, proxy component 510 may simply pass the request to server 130 (block 650—NO).

In other instances, however, the video quality requested by client 125 may be greater than the maximum allowed video quality (block 650—YES). This may correspond to a requested video stream being of a higher bandwidth than that permitted by the policies set for client 125. In this case, proxy component 510 may modify the message that includes the request from client 125 to change the request to correspond to a request for video of the maximum allowed video quality (block 660). The message (i.e., either the modified message or the unmodified message) may then be transmitted to server 130 (block 670). Server 130 may subsequently receive the request for the potentially lower requested video quality and may transmit the requested video, to client 125, at the lower requested video quality.

Figure 7:
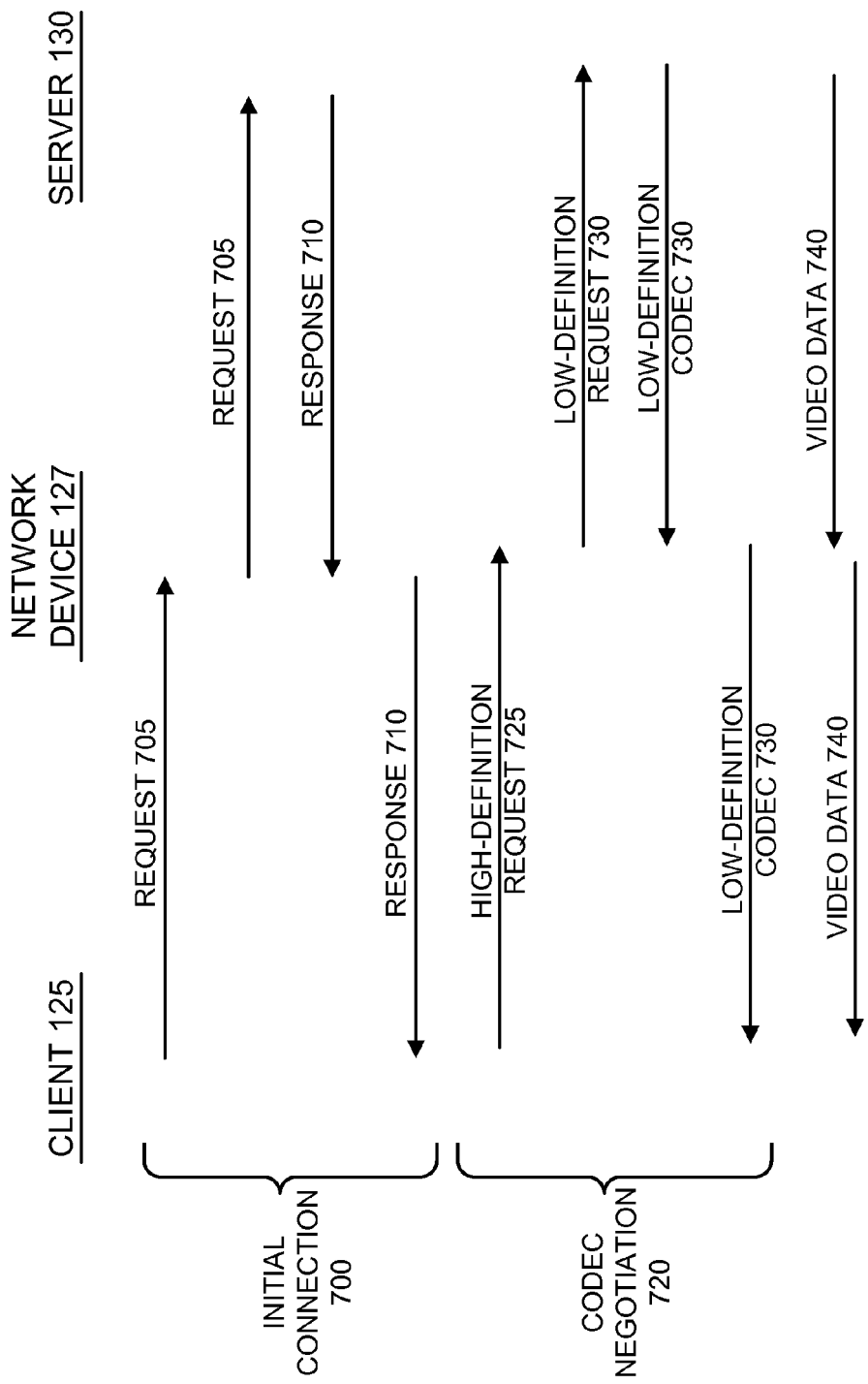
FIG. 7 is a timing diagram illustrating exemplary messages exchanged between a client, a network device, and a server.

FIG. 7 is a timing diagram illustrating exemplary messages exchanged between a client 125, a network device 127, and a server 130 when transcoding video negotiations by network device 127. In the example of FIG. 7, assume that the client requests a high-definition video stream but the policies set for the client indicate that only a low-definition request is permissible.

A communication session may be initially established, labeled as initial connection 700, between a client 125 and server 130. Client 125 may send an initial request message 705 for video to server 130. The request may pass through network device 127 and be received by server 130. Server 130 may respond, with response message 710, which may pass through network device 127 to client 125.

A codec negotiation phase may then be performed, labeled as codec negotiation 720. Codec negotiation 720 may include client 125 issuing a request, such as a high-definition request message 725. High-definition request message 725 may be a message indicating that client 125 requests high-definition video. Network device 127 may intercept this request and modify the request. The modified request, low-definition request message 730, may then be forwarded to server 130. Server 130 may respond to indicate that it will transmit using a codec corresponding to low definition video, illustrated as low-definition codec message 730. Network device 127 may forward low-definition codec message 730 to client 125.

Server 130 may subsequently transfer the requested low-definition video data, video data 740, to client 125. Video data 740 may pass through network device 127 on its way to client 125.

Although transcoding was primarily described as being applied to video streams, in alternative implementations, the concepts described herein may be applied to other types of data formats, such as audio streams.

Conclusion

As described above, a network device may control the quality of video delivered to clients. The quality of video delivered to a particular client may be based on network policies. Advantageously, an entity can control bandwidth consumed by a group of clients.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 6, the order of the acts may be varied in other implementations consistent with the invention. Moreover, non-dependent acts may be implemented in parallel.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   monitoring, by a network device, communications between a plurality of client devices and an external network;
   detecting, by the network device and based on the monitoring, a negotiation for a video stream occurring between a first client device, of the plurality of client devices, and a server device in the external network, the negotiation including at least a first message from the first client device indicating a requested video quality;
   determining, by the network device, a maximum allowed video quality for the first client device by accessing stored policy information associated with the first client device;
   determining, by the network device and based on accessing the stored policy information, that the requested video quality is greater than the maximum allowed video quality;
   transcoding, by the network device and when the requested video quality by the first client device is greater than the maximum allowed video quality, the first message, from a first encoding standard to a second encoding standard, to change the requested video quality to be equal to the maximum allowed video quality; and
   transmitting, by the network device, the transcoded first message to the server device in place of the first message.

2. The method of claim 1, where determining the maximum allowed video quality includes:
   determining the maximum allowed video quality based on policies set for a local network that includes the plurality of client devices.

3. The method of claim 1, where the external network includes a wide area network (WAN) or the Internet.

4. The method of claim 1, where the network device includes a gateway device, a firewall device, or a router device.

5. The method of claim 1, where the first message includes an indication of the video quality as a level of compression of a video stream or a resolution of the video stream.

6. The method of claim 1, where monitoring communications between the plurality of client devices and the external network includes:
   monitoring messages, associated with one or more of a plurality of protocols, transmitted between the plurality of client devices and the external network.

7. The method of claim 6, where the one or more of the plurality of protocols include session initiation protocol (SIP) or H.323.

8. The method of claim 1, where detecting a negotiation for a video stream includes intercepting portions of the negotiation relating to codec negotiations for the video stream.

9. A network device comprising:
input/output ports to connect a plurality of client devices within a local area network to server devices in an external network; and
a proxy component to:
monitor communications between the plurality of client devices and the server devices;
receive information relating to a maximum allowed video quality for the plurality of client devices;
intercept messages from the plurality of client devices relating to codec negotiations for video streams requested by the plurality of client devices;
determine, based on accessing network policy information associated with a client device, of the plurality of client devices, whether a video quality requested in a first intercepted message, from the client device and of the plurality of intercepted messages, is greater than the maximum allowed video quality for the client device;
transcode the first intercepted message, from a first encoding standard to a second encoding standard, when the video quality requested in the first intercepted message is greater than the maximum allowed video quality; and
transmit the transcoded first intercepted message in place of the first intercepted message.

10. The network device of claim 9, further comprising:
a policy engine to store the network policy information associated with the first client device and network policy information associated with other client devices of the plurality of client devices, where the proxy component receives the information relating to the maximum allowed video quality from the policy engine.

11. The network device of claim 9, where the proxy component, when receiving the information relating to the maximum allowed video quality, receives the information from a policy engine operating within the local area network.

12. The network device of claim 9, where the network device includes a gateway device, a firewall device, or a router device.

13. The network device of claim 9, where the first intercepted message includes an indication of the video quality as a level of compression of a video stream or a resolution of the video stream.

14. The network device of claim 9, where the proxy component, when monitoring communications between the plurality of client devices and the server devices, monitors messages transmitted, using one or more of a plurality of protocols, between the plurality of client devices and the server devices.

15. The network device of claim 14, where the one or more of the plurality of protocols include session initiation protocol (SIP) or H.323.

16. A device comprising:
a memory to store instructions; and
a processor to execute the instructions to:
monitor communications between a client device and an external network;
detect a negotiation for a video stream occurring between the client device and a server device in the external network, the negotiation including at least a first message from the client device indicating a requested video quality;
determine a maximum allowed video quality for the client device by accessing stored policy information associated with the client device;
determine, based on accessing the stored policy information, that the requested video quality is greater than the maximum allowed video quality;
transcode, when the requested video quality is greater than the maximum allowed video quality, the first message, from a first encoding standard to a second encoding standard, to change the requested video quality to be equal to the maximum allowed video quality; and
transmit the modified first message to the server device in place of the first message.

17. The device of claim 16, where the processor is further to:
determine the maximum allowed video quality based on policies set for a local network that includes the client device.

18. The device of claim 16, where the device includes a network gateway device, a firewall device, or a router device.

19. The device of claim 16, where the first message includes an indication of the video quality as a level of compression of the video stream or a resolution of the video stream.

20. The device of claim 16, where the processor, when detecting the negotiation, is further to:
intercept portions of the negotiation relating to codec negotiations for the video stream.

* * * * *